United States Patent
Zhu

(10) Patent No.: US 8,182,942 B2
(45) Date of Patent: May 22, 2012

(54) ANODE AND LITHIUM BATTERY WITH THE ANODE

(75) Inventor: Jiang Zhu, Guangdong (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 13/277,412

(22) Filed: Oct. 20, 2011

(65) Prior Publication Data

US 2012/0034505 A1     Feb. 9, 2012

Related U.S. Application Data

(63) Continuation of application No. PCT/CN2010/071935, filed on Apr. 20, 2010.

(30) Foreign Application Priority Data

Apr. 29, 2009 (CN) .......................... 2009 1 0050465

(51) Int. Cl.
*H01M 4/133* (2010.01)
*H01M 4/62* (2006.01)
*H01M 10/0525* (2010.01)

(52) U.S. Cl. .................................. 429/231.8; 429/218.1

(58) Field of Classification Search ............... 429/218.1, 429/231.8
See application file for complete search history.

(56) References Cited

U.S. PATENT DOCUMENTS

| | | | | |
|---|---|---|---|---|
| 5,595,841 A | * | 1/1997 | Suzuki | 429/217 |
| 5,721,069 A | * | 2/1998 | Shoji et al. | 429/213 |
| 6,183,907 B1 | * | 2/2001 | Barusseau et al. | 429/217 |
| 6,656,633 B2 | | 12/2003 | Yamakawa et al. | |
| 2005/0158624 A1 | | 7/2005 | Park et al. | |

FOREIGN PATENT DOCUMENTS

| | | |
|---|---|---|
| CN | 1641916 A | 7/2005 |
| JP | 110671213 A | 3/1999 |
| JP | 2007109628 A * | 4/2007 |

OTHER PUBLICATIONS

International Search Report mailed Jul. 22, 2010, for International Application No. PCT/CN2010/071935.

Written Opinion of the International Searching Authority mailed Jul. 22, 2010, for International Application No. PCT/CN2010/071935.

* cited by examiner

*Primary Examiner* — Gregg Cantelmo

(74) *Attorney, Agent, or Firm* — Finnegan, Henderson, Farabow, Garrett & Dunner, LLP

(57) ABSTRACT

An anode and a lithium battery comprising the same are disclosed. The anode comprises a current collector, and an anode material coated on or filled within the current collector. The anode material comprises a carbon material and an adhesive, and the adhesive comprises a hydrophobic polymer binder and a sodium carboxymethyl cellulose, in which an average molecular weight of the sodium carboxymethyl cellulose ranges from about $10 \times 10^5$ to about $12 \times 10^5$, a substitution degree of the sodium carboxymethyl cellulose ranges from about 0.65 to about 0.9, and the sodium carboxymethyl cellulose ranges from about 0.5% to about 0.7% of the anode material by weight.

14 Claims, No Drawings

ANODE AND LITHIUM BATTERY WITH THE ANODE

CROSS-REFERENCE TO RELATED APPLICATION

The present application is a continuation of International Application No. PCT/CN2010/071935, filed Apr. 20, 2010, designating the United States of America, which claims priority of and benefits to Chinese Patent Application No. 200910050465.7, filed with the State Intellectual Property Office of the People's Republic of China (SIPO) on Apr. 29, 2009, the entirety of both of which are hereby incorporated by reference.

TECHNICAL FIELD

The present invention generally relates to batteries, more particularly to an anode and a lithium battery with the anode.

BACKGROUND

Sodium carboxymethyl cellulose (CMC) is a common hydrophilic polymer binder for lithium ion batteries, and is often combined with hydrophobic polymer binders in usage, such as styrene-butadiene rubber (SBR), polytetrafluoroethylene (PTFE), and acrylonitrile-butadiene rubber (NBR). There are a variety of CMC suitable as lithium-ion battery binders. The CMC used as lithium-ion battery binders may have different molecular weights and structures. Nevertheless, when CMC with an average molecular weight of less than $5 \times 10^5$ is used as an adhesive for lithium ion batteries with hydrophobic polymer binders, it often causes reduced dispersion of carbon material in the anode slurry, poor uniformity of the anode, and thus poor low-temperature discharge performance of the battery.

SUMMARY

The present invention is directed to solve at least one of the above problems in the prior art.

Accordingly, in a first aspect, one embodiment disclosed herein includes an anode comprising a current collector; and an anode material coated on or filled within the current collector. The anode material includes a carbon material and an adhesive. The adhesive further includes a hydrophobic polymer binder and a sodium carboxymethyl cellulose, in which an average molecular weight of the sodium carboxymethyl cellulose ranges from about $10 \times 10^5$ to about $12 \times 10^5$, a substitution degree of the sodium carboxymethyl cellulose ranges from about 0.65 to about 0.9, and the sodium carboxymethyl cellulose ranges from about 0.5% to about 0.7% of the anode material by weight.

In some embodiments, the hydrophobic polymer binder comprises a styrene-butadiene rubber.

In some embodiments, a weight ratio of the sodium carboxymethyl cellulose to the styrene-butadiene rubber in the anode material ranges from about 0.2 to about 0.4.

In some embodiments, the carbon material is more than about 90% of the anode material by weight.

In a second aspect, one embodiment disclosed herein includes a lithium battery comprising a battery shell, an electrolyte received in the shell and a battery core disposed in the shell. The battery core includes a cathode, a separator and an anode which are wound or superposed in turn, the anode being the anode described above.

Other variations, embodiments and features of the present disclosure will become evident from the following detailed description and claims.

DETAILED DESCRIPTION OF THE EMBODIMENTS

It will be appreciated by those of ordinary skill in the art that the disclosure can be embodied in other specific forms without departing from the spirit or essential character thereof. The presently disclosed embodiments are therefore considered in all respects to be illustrative and not restrictive.

In some embodiments of the present disclosure, there is provided an anode for lithium-ion batteries, comprising a current collector; and an anode material coated on or filled within the current collector. The anode material includes a carbon material and an adhesive, and the adhesive further includes a hydrophobic polymer binder and a sodium carboxymethyl cellulose. An average molecular weight of the sodium carboxymethyl cellulose may range from about $10 \times 10^5$ to about $12 \times 10^5$, a substitution degree of the sodium carboxymethyl cellulose may range from about 0.65 to about 0.9, and the sodium carboxymethyl cellulose may range from about 0.5% to about 0.7% of the anode material by weight.

With the above composition of sodium carboxymethyl cellulose in the anode material, a battery with the anode may have improved low-temperature discharge performance and increased high rate discharge performance.

The substitution degree of the sodium carboxymethyl cellulose can be defined as the number of hydroxyl groups substituted by carboxymethyl groups per anhydroglucose unit.

In some embodiments, a weight ratio of the sodium carboxymethyl cellulose to the styrene-butadiene rubber in the anode material ranges from about 0.2 to about 0.4. The hydrophobic polymer binder can be any proper binder in the art. In some embodiments, the hydrophobic polymer binder is at least one selected from styrene-butadiene rubber (SBR), polytetrafluoroethylene (PTFE), nitrile butadiene rubber (NBR) and polyvinylidene fluoride (PVDF). In some embodiments, the hydrophobic polymer binder comprises a styrene-butadiene rubber.

The carbon material can be chosen without limitation from natural graphite, artificial graphite, mesocarbon microbeads (MCMB), petroleum coke, carbon fiber and polymeric carbon. In some embodiments, the average particle size of the carbon material is greater than about 400 meshes. In some embodiments, the carbon material is more than about 90% of the anode material by weight.

According to some embodiments of the present disclosure, there is provided a lithium battery The lithium battery comprises a battery shell, an electrolyte received in the shell and a battery core disposed in the shell. The battery core includes a cathode, a separator and an anode which are wound or superposed in turn. The anode may be the anode described above.

The following examples provide additional details of the anode according to some embodiments of the present disclosure.

Embodiment 1

(1) Preparation of the Anode

A mixture containing graphite, CMC, SBR, and $H_2O$ in a weight ratio of about 100:0.6:2.5:110 can be obtained and the mixture can be stirred at a speed of 700 rpm and a temperature of 25° C. for 2.5 h to obtain an anode slurry. The CMC may have an average molecular weight of about $11.5 \times 10^5$ and a substitution degree of about 0.7.

The anode slurry prepared above can be applied on a copper foil current collector, the thickness of the copper foil being about 8 microns. The copper foil coated with the anode slurry is dried at about 90° C. for 10 minutes. The coated copper foil is pressed and cut to obtain an anode plate having a dimension of about 55 cm in length, about 3.5 cm in width, and about 0.11 mm in thickness.

(2) Preparation of the Cathode

A mixture containing $LiCoO_2$, acetylene black A, acetylene black B, PVDF and NMP in a weight ratio of about 100:2:3:3.5:110 and be obtained and the mixture can be stirred to obtain a cathode slurry. The cathode slurry prepared above is applied on an aluminum foil current collector, the thickness of the aluminum foil being about 12 microns. The aluminum foil coated with the cathode slurry is dried at about 100° C. for 10 minutes. The coated aluminum foil is pressed and cut to obtain a cathode plate having a dimension of about 55 cm in length, about 3.5 cm in width, and about 0.11 mm in thickness.

(3) Manufacture of the Battery

The cathode prepared above, a polypropylene (PP) separator film, and the anode prepared above can be wound and superposed in turn to form a square-shaped lithium-ion battery core. The battery core is disposed within a shell having a dimension of about 50 mm×about 5 mm×about 34 mm. An electrolyte of about 3.8 grams may be injected into the shell, and the shell is air-sealed to form a LP053450AR0U lithium battery. The electrolyte may include $LiPF_6$, ethylene carbonate (EC) and dimethyl carbonate (DMC). The design capacity of the battery may have about 1 C equal to about 720 mAh.

The lithium-ion battery prepared above is labeled as A1.

Comparative Example 1

A comparative lithium battery may be prepared in a method substantially similar to that in Embodiment 1, except for an anode slurry including graphite, CMC, SBR, and $H_2O$ in a weight ratio of about 100:1.5:2.5:110. In this comparative sample, the CMC may have an average molecular weight of about $5 \times 10^5$ and a substitution degree of about 0.9. The design capacity of the battery may have about 1 C equal to about 720 mAh.

The comparative lithium-ion battery prepared above is labeled as AC1.

Testing Examples

The chemical reagent/material and instruments used in Embodiment 1, Comparative example 1 and Testing examples are listed in Tables 1 and 2.

TABLE 1

The chemical reagent/material used in the examples.

| Chemical Reagent/Material | Type | Source |
| --- | --- | --- |
| $LiCoO_2$ | CP02 | BYD Shenzhen |
| Graphite | P15B-CH | Carbon Co. Japan |
| Sodium carboxymethyl cellulose (CMC; Embodiment 1) | BVH8 | Hercules Co. |
| Sodium carboxymethyl cellulose (CMC; Comparative example 1) | AQUD4020 | Hercules Co. |
| Styrene-butadiene rubber (SBR) | SD516 | Gaoqiao BASF, Shanghai |
| N-methyl pyrrolidone (NMP) | | Haifeng, Anhui |
| Acetylene black A | KS6 | Timcal Co. |

TABLE 1-continued

The chemical reagent/material used in the examples.

| Chemical Reagent/Material | Type | Source |
| --- | --- | --- |
| Acetylene black B | Supper-P | Timcal Co. |
| PVDF | 9100 | WuYu Chemical Co. |

TABLE 2

The instruments used in the examples.

| Instrument | Type | Source |
| --- | --- | --- |
| BK Battery Test System | 6061 | Guangzhou Kinte Industry Co., Ltd. |
| Mixer | Eumix R30 | Fluko Shanghai |

(1) Capacity Testing

At room temperature, 100 batteries A1 and 100 batteries AC1 were charged at 360 mA (0.5 C) to 4.2 V, charged at a constant voltage of 4.2 V to a cut-off current of 36 mA (0.05 C), and discharged at 360 mA (0.5 C) to a cut-off voltage of 3.0 V. The average discharge capacity of the 100 batteries A1 was about 753 mAh, and the average discharge capacity of the 100 batteries AC1 was about 734 mAh.

Based on the results, the batteries A1 and AC1 had the same design capacity, but the practical discharge capacity of A1 was about 10 mAh greater than that of AC1.

(2) Rate Discharge Performance Testing

At room temperature, 100 batteries A1 and 100 batteries AC1 were charged at 360 mA (0.5 C) to 4.2 V, charged at a constant voltage of 4.2 V to a cut-off current of 36 mA (0.05 C), and then discharged at different discharge rates to a cut-off voltage of 3.0 V. The results of the battery A1 (as an average of 100 samples) and the battery AC1 (as an average of 100 samples) are listed in Tables 3 and 4.

TABLE 3

Discharge capacities at different discharge rates.

| | Test | | | | |
| --- | --- | --- | --- | --- | --- |
| Battery | 0.2 C. discharge capacity (mAh) | 0.5 C. discharge capacity (mAh) | 1 C. discharge capacity (mAh) | 2 C. discharge capacity (mAh) | 3 C. discharge capacity (mAh) |
| A1 | 785 | 753 | 713 | 695 | 681 |
| AC1 | 771 | 734 | 685 | 671 | 640 |

TABLE 4

Discharge capacities at high discharge rates.

| Battery | 1 C. discharge capacity/0.5 C. discharge capacity (%) | 2 C. discharge capacity/0.5 C. discharge capacity (%) | 3 C. discharge capacity/0.5 C. discharge capacity (%) |
| --- | --- | --- | --- |
| A1 | 90.8 | 88.5 | 86.8 |
| AC1 | 88.8 | 87.0 | 83.0 |

Based on the results of Tables 3 and 4, the battery A1 had a better rate discharge performance than the battery AC1.

(3) Low Temperature Storage Performance Testing

At room temperature, 100 batteries A1 and 100 batteries AC1 were charged at 360 mA (0.5 C) to 4.2 V, charged at constant voltage of 4.2 V to cut-off current of 36 mA (0.05 C), and then discharged at 360 mA (0.5 C) to cut-off voltage of 3.0 V at different temperatures. The results of the battery A1 (as an average of 100 samples) and the battery AC1 (as an average of 100 samples) are listed in Tables 5 and 6.

TABLE 5

Low temperature storage performance

| Battery | Test | | | | |
|---|---|---|---|---|---|
| | 25° C. discharge capacity (mAh) | 0° C. discharge capacity (mAh) | −10° C. discharge capacity (mAh) | −20° C. discharge capacity (mAh) | −30° C. discharge capacity (mAh) |
| A1 | 753 | 488 | 354 | 281 | 208 |
| AC1 | 734 | 465 | 323 | 250 | 186 |

TABLE 6

Low temperature storage performance

| Battery | 0° C. discharge capacity/0.5 C. discharge capacity (%) | −10° C. discharge capacity/0.5 C. discharge capacity (%) | −20° C. discharge capacity/0.5 C. discharge capacity (%) | −30° C. discharge capacity/0.5 C. discharge capacity (%) |
|---|---|---|---|---|
| A1 | 64.8 | 47.0 | 37.3 | 27.6 |
| AC1 | 63.3 | 44.0 | 34.1 | 25.3 |

Based on the results of Tables 5 and 6, the battery A1 had a better low temperature storage performance than the battery AC1.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. An anode for lithium-ion batteries, comprising:
a current collector; and
an anode material coated on or filled within the current collector, and comprising a carbon material and an adhesive, the adhesive comprising a hydrophobic polymer binder and a sodium carboxymethyl cellulose,
wherein an average molecular weight of the sodium carboxymethyl cellulose ranges from $10\times10^5$ to $12\times10^5$, a substitution degree of the sodium carboxymethyl cellulose ranges from 0.65 to 0.9, and the sodium carboxymethyl cellulose ranges from 0.5% to 0.7% of the anode material by weight.

2. The anode for lithium-ion batteries according to claim 1, wherein the hydrophobic polymer binder comprises a styrene-butadiene rubber.

3. The anode for lithium-ion batteries according to claim 2, wherein a weight ratio of the sodium carboxymethyl cellulose to the styrene-butadiene rubber in the anode material ranges from 0.2 to 0.4.

4. The anode for lithium-ion batteries according to claim 1, wherein the carbon material is more than 90% of the anode material by weight.

5. The anode for lithium-ion batteries according to claim 1, wherein the hydrophobic polymer binder is at least one chosen from styrene-butadiene rubber (SBR), polytetrafluoroethylene (PTFE), nitrile butadiene rubber (NBR) and polyvinylidene fluoride (PVDF).

6. The anode for lithium-ion batteries according to claim 1, wherein the carbon material is selected from natural graphite, artificial graphite, mesocarbon microbeads (MCMB), petroleum coke, carbon fiber and polymeric carbon.

7. The anode for lithium-ion batteries according to claim 1, wherein the average particle size of the carbon material is greater than 400 meshes.

8. A lithium-ion battery, comprising a battery shell, an electrolyte received in the shell and a battery core disposed in the shell, the battery core comprising a cathode, a separator and an anode which are wound or superposed in turn, wherein the anode comprises:
a current collector; and
an anode material coated on or filled within the current collector, and comprising a carbon material and an adhesive, the adhesive comprising a hydrophobic polymer binder and a sodium carboxymethyl cellulose,
wherein an average molecular weight of the sodium carboxymethyl cellulose ranges from $10\times10^5$ to $12\times10^5$, a substitution degree of the sodium carboxymethyl cellulose ranges from 0.65 to 0.9, and the sodium carboxymethyl cellulose ranges from 0.5% to 0.7% of the anode material by weight.

9. The lithium-ion battery according to claim 8, wherein the hydrophobic polymer binder comprises a styrene-butadiene rubber.

10. The lithium-ion battery according to claim 9, wherein a weight ratio of the sodium carboxymethyl cellulose to the styrene-butadiene rubber in the anode material ranges from 0.2 to 0.4.

11. The lithium-ion battery according to claim 8, wherein the carbon material is more than 90% of the anode material by weight.

12. The lithium-ion battery according to claim 8, wherein the hydrophobic polymer binder is at least one chosen from styrene-butadiene rubber (SBR), polytetrafluoroethylene (PTFE), nitrile butadiene rubber (NBR) and polyvinylidene fluoride (PVDF).

13. The lithium-ion battery according to claim 8, wherein the carbon material is selected from natural graphite, artificial graphite, mesocarbon microbeads (MCMB), petroleum coke, carbon fiber and polymeric carbon.

14. The lithium-ion battery according to claim 8, wherein the average particle size of the carbon material is greater than 400 meshes.

* * * * *

UNITED STATES PATENT AND TRADEMARK OFFICE
CERTIFICATE OF CORRECTION

PATENT NO. : 8,182,942 B2  
APPLICATION NO. : 13/277412  
DATED : May 22, 2012  
INVENTOR(S) : Jiang Zhu Page 1 of 1

It is certified that error appears in the above-identified patent and that said Letters Patent is hereby corrected as shown below:

On the Title Page, Item (75), in the Inventor, "Guangdong (CN)" should read --Shenzhen (CN)--.

On the Title Page, Item (30), in the "Foreign Application Priority Data", "2009 1 0050465" should read --200910050465.7--.

Signed and Sealed this
Fourteenth Day of August, 2012

David J. Kappos
*Director of the United States Patent and Trademark Office*